United States Patent
Allen et al.

(10) Patent No.: US 7,509,388 B2
(45) Date of Patent: Mar. 24, 2009

(54) SYSTEM AND METHOD FOR DISPLAYING IM SESSION HISTORY AS TIME-BASED CALENDAR EVENTS

(75) Inventors: Timothy Eddie Allen, San Francisco, CA (US); Jeremy Gray Perry, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 442 days.

(21) Appl. No.: 11/360,896

(22) Filed: Feb. 23, 2006

(65) Prior Publication Data

US 2007/0198648 A1 Aug. 23, 2007

(51) Int. Cl.
*G06F 15/16* (2006.01)

(52) U.S. Cl. ..................................................... 709/207

(58) Field of Classification Search .................. None
See application file for complete search history.

(56) References Cited

U.S. PATENT DOCUMENTS

| | | | |
|---|---|---|---|
| 2003/0018718 A1 | 1/2003 | Maehiro | 709/205 |
| 2003/0105822 A1 | 6/2003 | Gusler et al. | 709/206 |
| 2003/0154250 A1 | 8/2003 | Miyashita | 709/204 |
| 2004/0015553 A1 | 1/2004 | Griffin et al. | 709/206 |
| 2004/0078446 A1 | 4/2004 | Daniell et al. | 709/206 |
| 2004/0158610 A1 | 8/2004 | Davis et al. | 709/206 |
| 2006/0129643 A1* | 6/2006 | Nielson et al. | 709/206 |
| 2007/0089071 A1* | 4/2007 | Zinn et al. | 715/844 |
| 2007/0143433 A1* | 6/2007 | Daigle | 709/207 |

* cited by examiner

*Primary Examiner*—Salad Abdullahi
*Assistant Examiner*—Clayton R Williams
(74) *Attorney, Agent, or Firm*—VanLeeuwen & VanLeeuwen (57) ABSTRACT

A system and method for displaying instant messaging (IM) session history as time-based calendar events is presented. A messaging system logs chat sessions between users and stores them as "chat events." When a user wishes to view previous chat sessions as time-based calendar events, the user sends a chat history request to an electronic calendar system. In turn, the electronic calendar system retrieves the chat events and formats the chat events, which are displayed on the electronic calendar for the user to view as time-based calendar events. Once displayed, the user is able to select one of the time-based calendar events in order to view the formatted chat event's details.

17 Claims, 7 Drawing Sheets

| | 17 May 04 Monday | 18 May 04 Tuesday | 19 May 04 Wednesday | 20 May 04 Thursday | 21 May 04 Friday |
|---|---|---|---|---|---|
| 7 am | | | | | |
| 8 am | | | | | |
| 9 am | | Interview Bill Smith 240 | Strategy Meeting 250 | | |
| 10 am | | | | | |
| 11 am | Lunch with Joe 230 | | | Lunch with Sue 260 | |
| 12 pm | | | | | |
| 1 pm | | | | | |
| 2 pm | | | | | Design Review 270 |
| 3 pm | | | | | |
| 4 pm | | | | | |
| 5 pm | | | | | |

CALENDAR — 200

220 ☐ Show Chat History

200

| | CALENDAR | | | | |
|---|---|---|---|---|---|
| | | | | 220 ☑ Show Chat History | |
| | 17 May 04 Monday | 18 May 04 Tuesday | 19 May 04 Wednesday | 20 May 04 Thursday | 21 May 04 Friday |
| 7 am | | | | ╱─ 340 | |
| 8 am | ╱─ 300 | | Strategy Meeting | J. Baker (8:15 am) 2 Others... | |
| 9 am | G. Jones (9:03 am) A. Smith (9:17 am) | Interview Bill Smith | | | ╱─ 350 |
| 10 am | | | | | R. Smith (10:12 am) 3 Others... |
| 11 am | Lunch with Joe | | | Lunch with Sue | |
| 12 pm | | | ╱─ 320 | | |
| 1 pm | | | R. Smith (1:05 pm) M. White (1:14 pm) 4 Others... | | |
| 2 pm | ╱─ 310 L. Page (2:41 pm) | | | | Design Review |
| 3 pm | | | | | |
| 4 pm | | | B. Johnson (4:12 pm) ╲─ 330 | | |
| 5 pm | | | | | |

SYSTEM AND METHOD FOR DISPLAYING IM SESSION HISTORY AS TIME-BASED CALENDAR EVENTS

BACKGROUND OF THE INVENTION

1. Technical Field

The present invention relates to a system and method for displaying instant messaging (IM) session history as time-based calendar events. More particularly, the present invention relates to a system and method for formatting logged chat events and overlaying the formatted chat events onto an electronic calendar.

2. Description of the Related Art

Many people today use an electronic calendar as a time-management tool to track commitments such as conference calls, meetings, and appointments. In addition to being an effective time-management tool, the electronic calendar also provides the benefit of allowing a user to recall information corresponding to past events. For example, a user may wish to recall information corresponding to a business trip that occurred two months ago. In this example, the user may access the electronic calendar and identify the business trip by time and date. Furthermore, the user may have entered detail information into the electronic calendar, such as specific customer meetings and customer names, which is retrievable using the electronic calendar.

Electronic calendars are typically stored on an electronic device, such as a computer, phone, or personal digital assistant. In addition to storing the electronic calendar, a user typically uses these devices as a communication tool, such as sending and receiving email. One prevalent tool that users use to communicate is instant messaging (IM), which allows a user to send/receive messages directly to/from another user when a user is logged onto a network. A user invokes a "chat session" with one or more users and, in turn, the users send messages to each other in a conversation-like manner.

Some instant messaging systems store a log, or chat history, of a user's chat sessions on the electronic device. The chat history may be stored as raw text files and viewed using a text editor. Or, the chat history may be viewable using a navigational device that functions like a file system explorer. In either case, existing art makes it difficult to recall chat history details.

Chat history, however, may be as important to a user as saved email messages. For example, a user may need to refer to a detail, decision, or a user's comment that occurred during a chat session. A challenge found with existing art is that there is no user-friendly approach to recall chat history in the same manner that there is with an electronic calendar.

What is needed, therefore, is a system and method that provides a time-based solution for a user to recall chat history details.

SUMMARY

It has been discovered that the aforementioned challenges are resolved using a system and method for formatting logged chat events and overlaying the formatted chat events onto an electronic calendar as time-based calendar events. A messaging system logs chat sessions between users and stores them as "chat events." When a user wishes to view previous chat sessions as time-based calendar events, the user sends a chat history overlay request to the electronic calendar system. In turn, the electronic calendar system retrieves the chat events and formats the chat events, which are displayed on the electronic calendar for the user to view as time-based calendar events.

A messaging system receives a chat session request from a user. The chat session request may come from the messaging system's user, or the chat session request may come from another user that is requesting a chat session with the messaging system's user. Once the messaging system receives a chat session request, the messaging system logs messages that are sent between the users during the chat session. When the chat session completes, the messages are stored in a group and saved as a "chat event."

When the user wishes to view chat history as time-based calendar events, the user sends a "chat history overlay request" to the user's calendar system in order to view chat event history on the user's electronic calendar. For example, the user may toggle a selection box located on the electronic calendar's user interface window in order to request the calendar system to overlay the chat events onto the electronic calendar.

The calendar system receives the chat history overlay request and retrieves the chat events from the storage area. In turn, the calendar system formats the chat events based upon calendar view settings, which may include a time increment resolution (15 minutes, 30 minutes, etc.), as well as color and/or font characteristics for overlaid chat events. For example, a user may wish to view the formatted chat events in red in order for the formatted chat events to stand out over other calendar events (meetings, etc.). In addition, the user may set a "time block size limit" that limits the amount of space on a calendar that a lengthy chat event utilizes (e.g., one hour). For example, a user may have been in a chat session over a period of five hours, and the user may not wish to have the chat event displayed on a calendar over the entire five-hour period. Instead, the user sets the time block size limit that, using the example described above, shows the five-hour chat session in a one-hour time block that begins at the time that the chat session started.

Once the calendar system formats the chat events, the calendar system overlays the formatted chat events onto the electronic calendar as time-based calendar events. The time-based calendar events are placed on the electronic calendar at the starting time and date of the corresponding chat sessions' first message. Once displayed, the user may select one of the time-based calendar events in order to view the formatted chat event's details.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
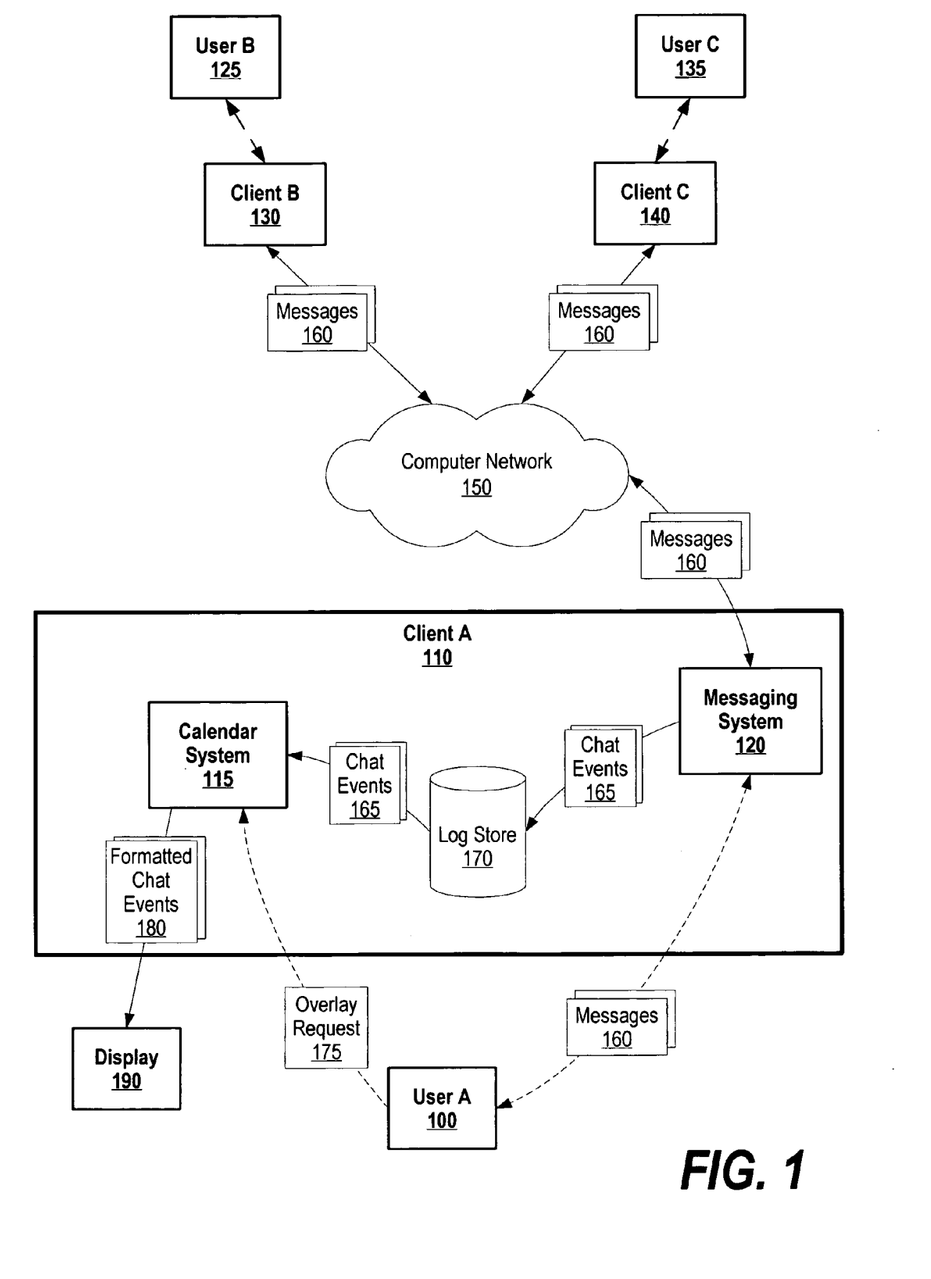
FIG. 1 is a diagram showing a user requesting a calendar system to overlay chat history on a calendar.

FIG. 1 is a diagram showing a user requesting a calendar system to overlay chat history on a calendar.

User A 100 uses client A 110 to conduct instant messaging chat sessions with other users via messaging system 120. As those skilled in the art will appreciate, messaging system 120 may be a standard off the shelf instant messaging program that provides a user with the ability to send and receive messages over a computer network (computer network 150), such as the Internet. User A 100 also uses client A 110 to display a calendar on display 190 via calendar system 115.

Messaging system 120 waits to receive a chat session request from a user. The chat session request may come from user A 100 by sending messages 160, or the chat session request may come from user B 125 or user C 135 sending a message (messages 160) using client B 130 and client C 140, respectively, to client A 110 over computer network 150. Once messaging system 120 receives a chat session request, messaging system 120 logs messages 160 that are sent between the users. In one embodiment, messaging system 120 logs each message as it is received in log store 170 (chat events 165). In another embodiment, messaging system 120 logs each message in a temporary storage area and, when the chat session is complete, stores a chat event (chat events 165) in log store 170. Each of chat events 165 corresponds to a particular chat session, which includes the messages that were sent between the users during the chat session (see FIG. 5 and corresponding text for further details). Log store 170 may be stored on a nonvolatile storage area, such as a computer hard drive.

When user A 100 wishes to view the chat events on an electronic calendar that is displayed on display 190, user A 100 sends a chat history overlay request (overlay request 175) to calendar system 115. For example, user A 100 may toggle a selection box, such as selection box 220 shown in FIG. 2, to request calendar system 115 to overlay the chat events.

Calendar system 115 receives overlay request 175 and retrieves chat events 165 from log store 170. In turn, calendar system 115 formats chat events 165 based upon calendar view settings. The calendar view settings may include a time increment resolution (15 minutes, 30 minutes, etc.), as well as color and/or font characteristics for overlaid chat events. For example, a user may wish to view the formatted chat events in red in order for the formatted chat events to stand out over other calendar events (meetings, etc.). In addition, the user may set a "time block size limit" (e.g., one hour) that limits the amount of space on a calendar that a lengthy chat event utilizes. For example, a user may have been in a chat session over a period of five hours, and the user may not wish to have the chat event displayed on a calendar over the entire five-hour period. Instead, the user sets the time block size limit that, using the example described above, shows the five-hour chat session in a one-hour time block that begins at the time that the chat session started.

Once calendar system 115 formats chat events 165, calendar system 115 overlays formatted chat events 180 onto an electronic calendar that is shown on display 190 as time-based calendar events. The time-based calendar events are placed on the electronic calendar at the starting time and date of corresponding chat sessions' first message (see FIG. 3 and corresponding text for further details). The user is able to select one of the time-based calendar events in order to view the formatted chat events' details (see FIG. 4 and corresponding text for further details).

Figure 2:
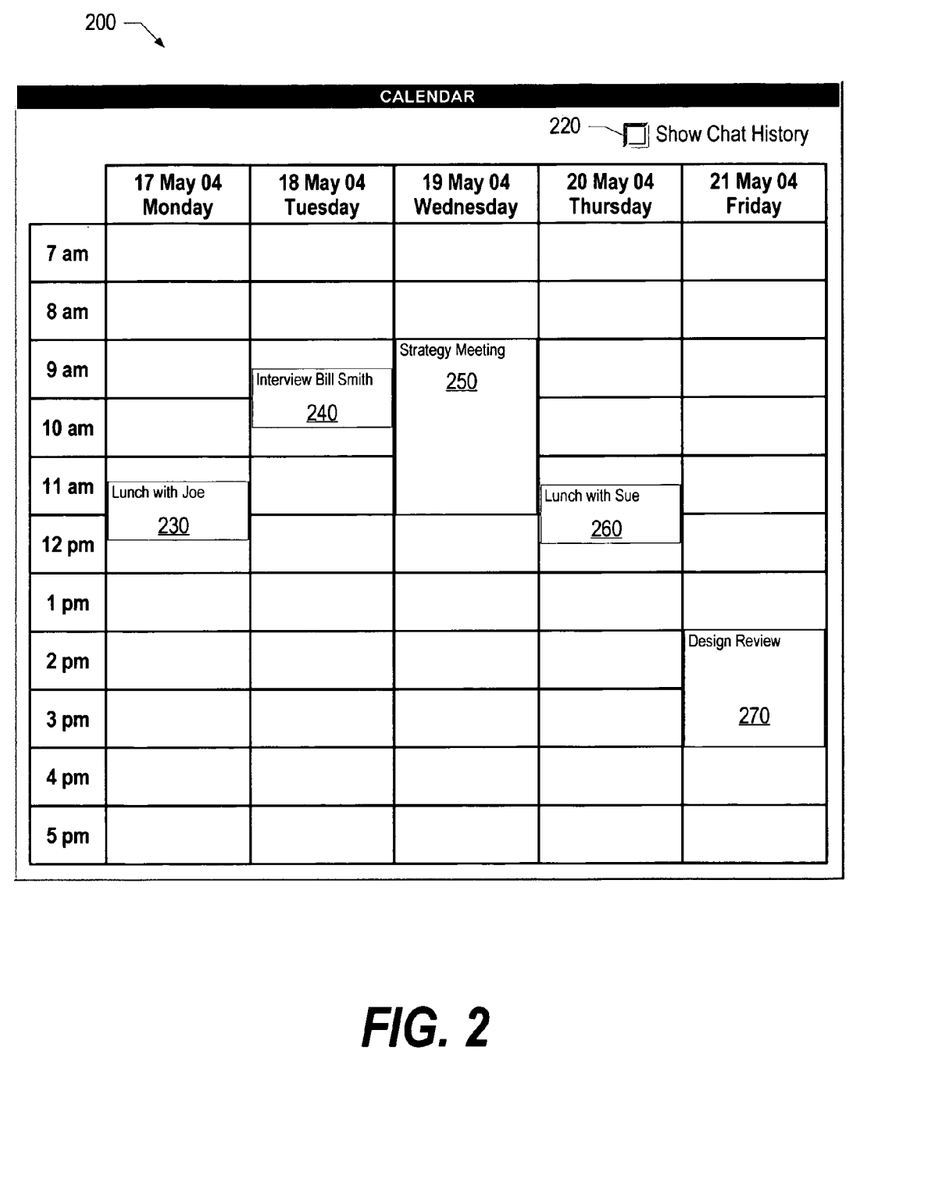
FIG. 2 is a diagram showing a calendar without chat history displayed.

FIG. 2 is a diagram showing an electronic calendar without chat history displayed. A user's computer system displays calendar 200 on a display in order for the user to manage the user's schedule. Calendar 200 shows events 230 through 270, which are displayed at various times and dates on calendar 200. When a user wishes to overlay chat events onto calendar 200, the user may select selection box 220, which sends a request to a calendar program to overlay the chat events onto calendar 200 (see FIG. 3 and corresponding text for further details).

Figure 3:
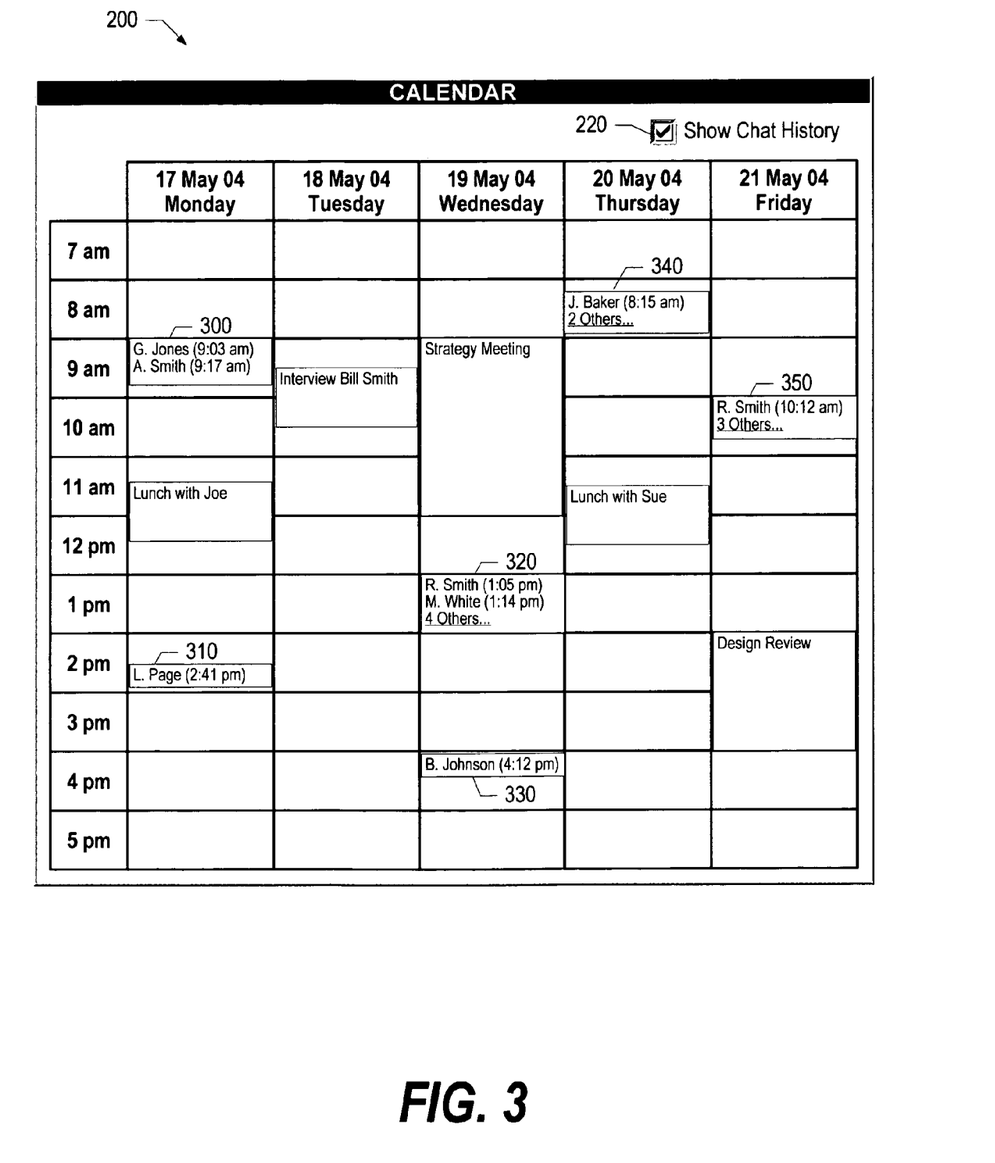
FIG. 3 is a diagram showing chat history overlaid on a calendar.

FIG. 3 is a diagram showing chat history overlaid on an electronic calendar. Calendar 200 and selection box 220 are the same as that shown in FIG. 2. However, selection box 220 is selected in FIG. 3, which instructs a calendar program to overlay chat events onto calendar 200.

As can be seen in FIG. 3, chat events 300 through 350 are overlaid onto calendar 200. Each of these chat events are overlaid on calendar 200 based upon the chat session's start time. For example chat event 300 is overlaid on calendar 200 at 9:00 AM on May $17^{th}$ because the corresponding chat session began at 9:03 AM. When the user wishes to view a chat event's details, the user selects the chat event using a mouse pointer (see FIG. 4 and corresponding text for further details regarding chat event details).

Figure 4:
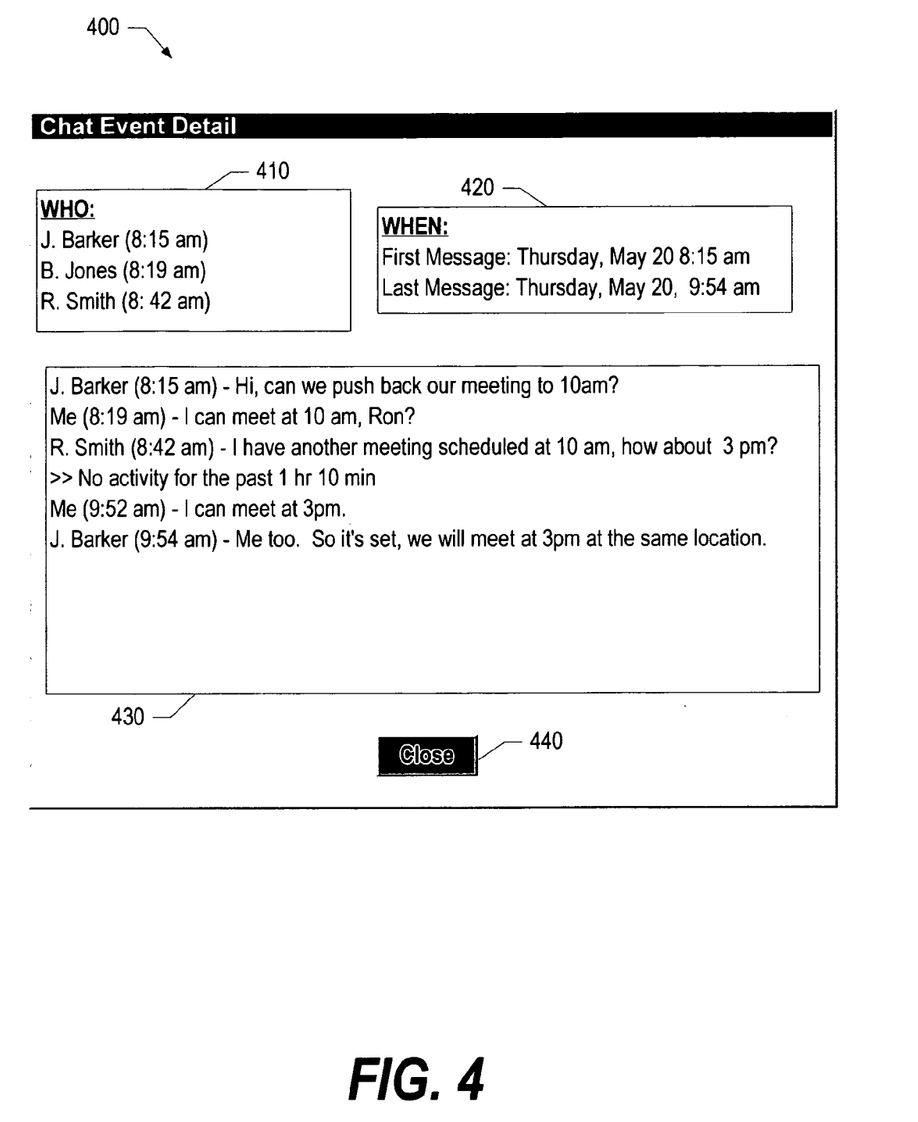
FIG. 4 is a diagram showing chat entry details.

FIG. 4 is a diagram showing chat event details of a chat event. A user selects an overlaid chat event, such as chat event 340 shown in FIG. 3. In turn, a calendar program displays window 400, which includes chat event details corresponding to the selected chat event. As can be seen by the embodiment shown in FIG. 4, the chat event details include a list of participants (text box 410), the start time and stop time of the chat session (text box 420), and the messages that are sent between chat session participants (text box 430).

Text box 410 shows each chat session participant (user) along with a time at which the participant sent their first message. For example, text box 410 shows that "J. Barker" sent a first message at "8:15 AM." The user's message itself is shown in text box 430, which is the first message of the chat session. In addition, text box 420 shows that the first message was sent on "Thursday, May 20 at 8:15 AM." This information is used to overlay the chat event onto a calendar at the appropriate time and date.

When the user is finished viewing the chat event details shown on window 400, the user may select command button 440, which closes window 400 and returns to a calendar window, such as one that is shown in FIG. 3.

Figure 5:
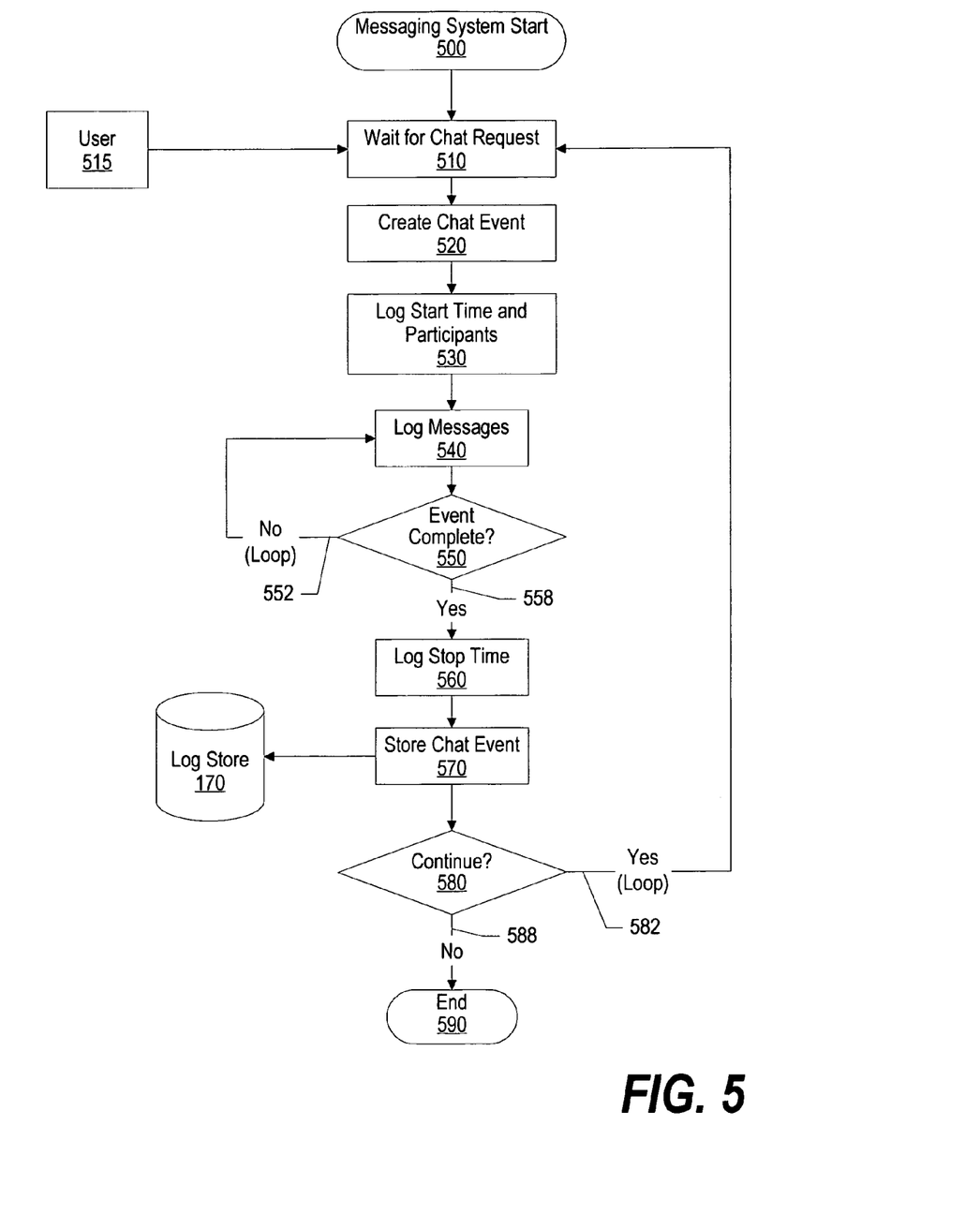
FIG. 5 is a flowchart showing steps taken in logging chat events.

FIG. 5 is a flowchart showing steps taken in logging chat events. On a user's computer, an instant messaging program receives and sends messages to other users over a computer network (e.g. messaging system 120 shown in FIG. 1). The messaging system logs the messages into chat events, which are stored in a nonvolatile storage area and later retrieved by a calendar system to overlay on a calendar (see FIG. 6 and corresponding text for further details).

Computer system processing commences at 500, whereupon processing waits for a chat session request from user 515 at step 510. User 515 may be the computer system's user (e.g., user A 100 shown in FIG. 1) or user 515 may be a remote user that sends a chat request to the owner of the computer system (e.g., user B 125 or user C 135 shown in FIG. 1).

Once processing receives a chat session request, processing creates a chat event at step 520. The chat event is a repository for logging messages that are sent between users for the particular chat session. At step 530, processing logs the chat session start time, the chat session participants, and the time at which the chat session participants joined the chat session. Processing logs messages between users at step 540, which includes the message itself, the user's identifier that sent the message, and the time at which the message was sent (see FIG. 4 and corresponding text for further details).

A determination is made as to whether the chat event is complete (decision 550). Various embodiments are possible to determine whether the chat event is complete. One embodiment of the present invention is that the chat event is complete when the computer system's user closes a chat window. Another embodiment of the present invention is that the chat event is complete when the computer system's user logs off. Yet another embodiment of the present invention is that the chat event completes when there is a predetermined amount of time of inactivity (timeout). For example, a user may be involved in a chat session with another user at the end of the day and forget to close the window or log off the computer system. In this example, the messaging system identifies that no messages are sent between users for a period of time, such as one hour, and automatically ends the chat event.

If the chat event is not complete, decision 550 branches to "No" branch 552 which loops back to continue to log messages. This looping continues until the chat event completes, at which point decision 550 branches to "Yes" branch 558 whereupon processing logs a chat event stop time at step 560. At step 570, processing stores the chat event in log store 170. Log store 170 is the same as that shown in FIG. 1, and may be stored on a nonvolatile storage area, such as a computer hard drive.

A determination is made as to whether processing should continue to log chat events (decision 580). If processing should continue to log chat events, decision 580 branches to "Yes" branch 582, which loops back to process more chat events. This looping continues until processing should terminate, at which point decision 580 branches to "No" branch 588, whereupon message system processing ends at 590.

Figure 6:
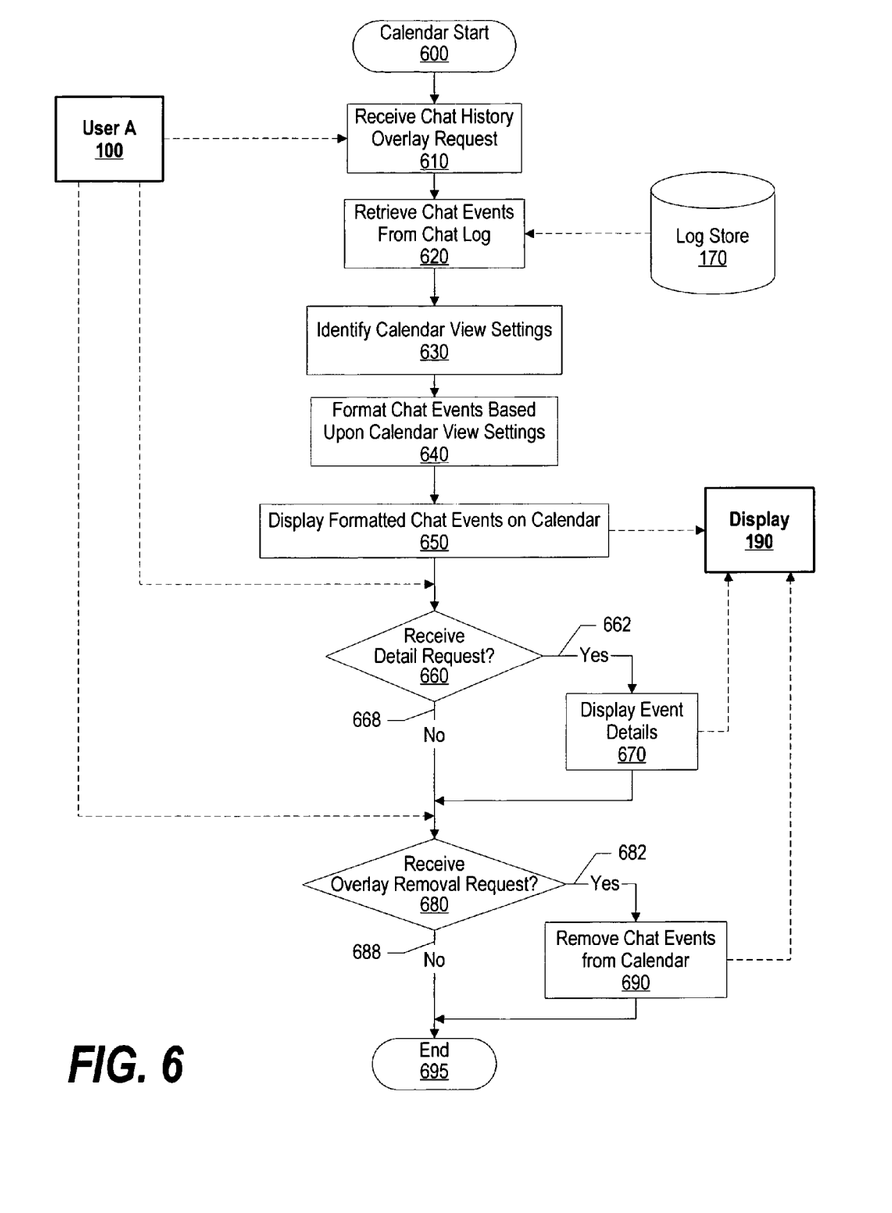
FIG. 6 is a flowchart showing steps taken in overlaying chat events onto a calendar.

FIG. 6 is a flowchart showing steps taken in overlaying chat events onto an electronic calendar. Once a messaging system logs a chat event, a user is able to overlay the chat event onto an electronic calendar in order to view the chat event as a time-based calendar event.

Calendar system processing commences at 600, whereupon processing receives a chat history overlay request from user A 100 at step 610. For example, user A 100 may toggle a chat history selection box in order to view chat events on a calendar, such as selection box 220 shown in FIG. 2. User A 100 is the same as that shown in FIG. 1.

At step 620, processing retrieves chat events from log store 170 in response to receiving the chat history overlay request. A messaging system, such as messaging system 120 shown in FIG. 1, previously stored the chat events in log store 170 (see FIG. 5 and corresponding text for further details). Log store 170 is the same as that shown in FIG. 1.

Processing identifies calendar view settings at step 630. For example, the calendar view settings may include a time increment resolution (15 minutes, 30 minutes, etc.), as well as color and/or font characteristics for overlaid chat events. For example, a user may wish to view overlaid events in red in order for the chat events to stand out over other calendar events (meetings, etc.). In addition, the user may set a "time block size limit" (e.g., one hour) that limits the amount of space on a calendar that a lengthy chat event utilizes. For example, a user may have been in a chat session whose chat event duration last for a period of five hours. In this example, the user may not wish to have the chat event displayed on a calendar over the entire five-hour period. Instead, the user sets the time block size limit that, using the example described above, shows the five-hour chat session in a one-hour time block that begins at the time that the chat session started.

At step 640, processing formats the chat events based upon the calendar view settings, such as changing the font, color, and time block size. In addition, when multiple users participated in the chat event, processing may identify the number of participants and determine the number of other users to display on overlaid chat event. For example, if six users participated in a one hour chat session, processing may determine that it is only able to display two of the six users' names, and should display the phrase "4 others" on the overlaid chat event (see FIG. 3 and corresponding text for further details).

Processing, at step 650, displays the formatted chat events as time-based calendar events on an electronic calendar that is shown on display 190. Display 190 is the same as that shown in FIG. 1. A determination is made as to whether user A 100 wishes to view details of one of the overlaid chat events (decision 660). For example, user A 100 may select one of the overlaid chat events using a mouse pointer.

If user A 100 wishes to view details of one of the overlaid chat events, decision 660 branches to "Yes" branch 662 whereupon processing displays the selected chat event's details (step 670). The chat event details may include each of the participant's names, when they began participating, the time of the first and last message, and the message details (see FIG. 4 and corresponding text for further details). If user A 100 does not wish to view details of one of the overlaid chat events, decision 660 branches to "No" branch 668 bypassing event detail overlaying steps.

A determination is made as to whether user A 100 wishes to remove the chat events from the calendar that is displayed on display 190 (decision 680). For example, user A 100 may toggle the chat history selection box again in order to view chat events on a calendar. If user A 100 wishes to remove the chat events from the calendar, decision 680 branches to "Yes" branch 682 whereupon processing removes the chat events from the calendar that are shown on display 190 (step 690).

On the other hand, if user A 100 does not wish to remove the chat events from the calendar, decision 680 branches to "No" branch 688 bypassing chat event removal steps. Calendar system processing ends at 695.

Figure 7:
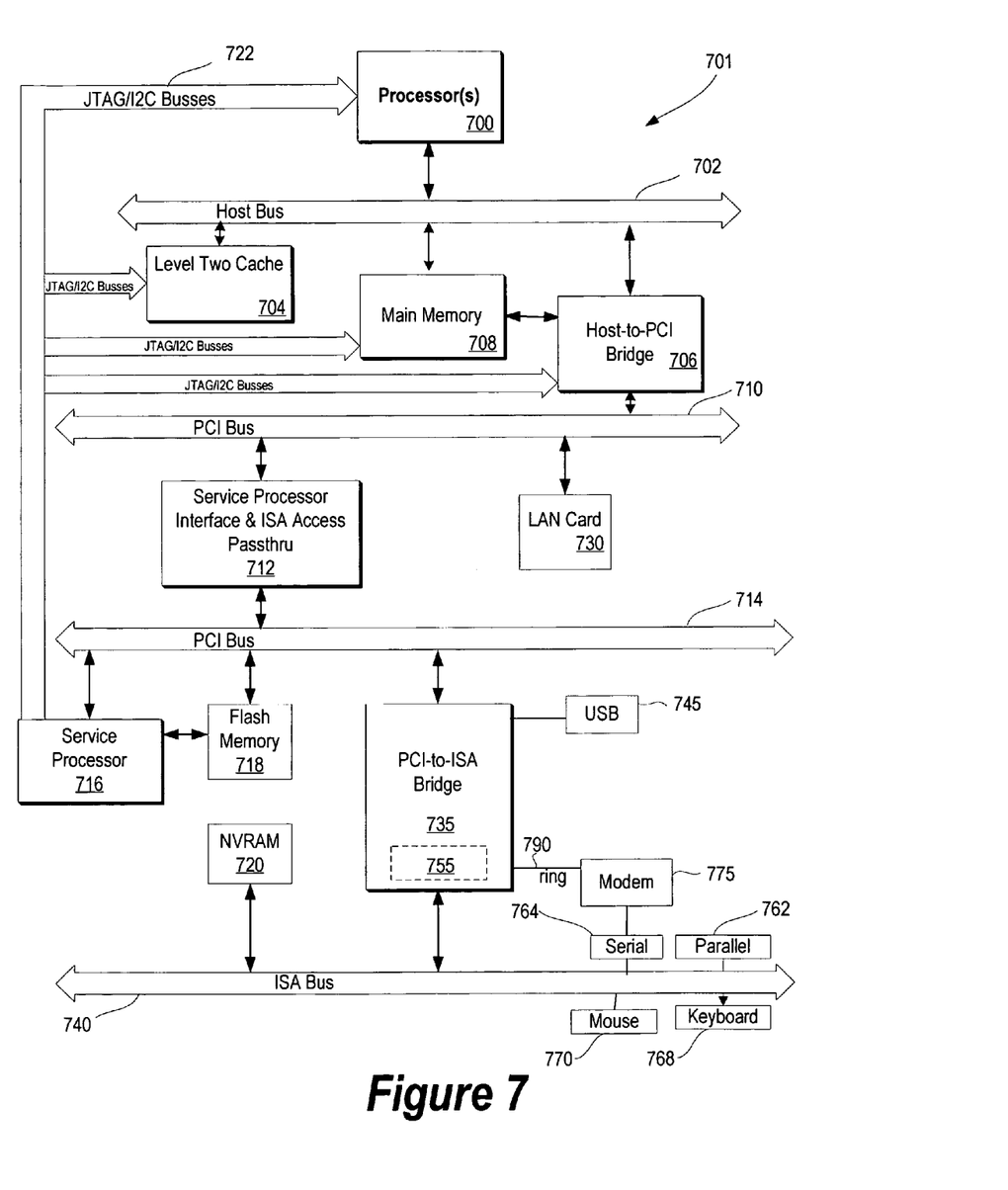
FIG. 7 is a block diagram of a computing device capable of implementing the present invention.

FIG. 7 illustrates information handling system 701 which is a simplified example of a computer system capable of performing the computing operations described herein. Computer system 701 includes processor 700 which is coupled to host bus 702. A level two (L2) cache memory 704 is also coupled to host bus 702. Host-to-PCI bridge 706 is coupled to main memory 708, includes cache memory and main memory control functions, and provides bus control to handle transfers among PCI bus 710, processor 700, L2 cache 704, main memory 708, and host bus 702. Main memory 708 is coupled to Host-to-PCI bridge 706 as well as host bus 702. Devices used solely by host processor(s) 700, such as LAN card 730, are coupled to PCI bus 710. Service Processor Interface and ISA Access Pass-through 712 provides an interface between PCI bus 710 and PCI bus 714. In this manner, PCI bus 714 is insulated from PCI bus 710. Devices, such as flash memory 718, are coupled to PCI bus 714. In one implementation, flash memory 718 includes BIOS code that incorporates the necessary processor executable code for a variety of low-level system functions and system boot functions.

PCI bus 714 provides an interface for a variety of devices that are shared by host processor(s) 700 and Service Processor 716 including, for example, flash memory 718. PCI-to-ISA bridge 735 provides bus control to handle transfers between PCI bus 714 and ISA bus 740, universal serial bus (USB) functionality 745, power management functionality 755, and can include other functional elements not shown, such as a real-time clock (RTC), DMA control, interrupt support, and system management bus support. Nonvolatile RAM 720 is attached to ISA Bus 740. Service Processor 716 includes JTAG and I2C busses 722 for communication with processor(s) 700 during initialization steps. JTAG/I2C busses 722 are also coupled to L2 cache 704, Host-to-PCI bridge 706, and main memory 708 providing a communications path between the processor, the Service Processor, the L2 cache, the Host-to-PCI bridge, and the main memory. Service Processor 716 also has access to system power resources for powering down information handling device 701.

Peripheral devices and input/output (I/O) devices can be attached to various interfaces (e.g., parallel interface 762, serial interface 764, keyboard interface 768, and mouse interface 770 coupled to ISA bus 740. Alternatively, many I/O devices can be accommodated by a super I/O controller (not shown) attached to ISA bus 740.

In order to attach computer system 701 to another computer system to copy files over a network, LAN card 730 is coupled to PCI bus 710. Similarly, to connect computer system 701 to an ISP to connect to the Internet using a telephone line connection, modem 775 is connected to serial port 764 and PCI-to-ISA Bridge 735.

While FIG. 7 shows one information handling system that employs processor(s) 700, the information handling system may take many forms. For example, information handling system 701 may take the form of a desktop, server, portable, laptop, notebook, or other form factor computer or data processing system. Information handling system 701 may also take other form factors such as a personal digital assistant (PDA), a gaming device, ATM machine, a portable telephone device, a communication device or other devices that include a processor and memory.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
   receiving a chat history overlay request;
   retrieving a chat event in response to receiving the chat history overlay request, the chat event including a plurality of messages;
   formatting the retrieved chat event;
   identifying a start time and a stop time corresponding to the chat event, the start time corresponding to a first message included in the plurality of messages and the stop time corresponds to a last message included in the plurality of messages;
   retrieving a time block size limit from a storage location;
   computing a chat event duration based upon the start time and the stop time;
   determining whether the chat event duration is longer than the time block size limit;
   in response to determining that the chat event duration is longer than the time block size limit, overlaying the formatted chat event on an electronic calendar as a time-based calendar event that begins at the start time and ends at a time that is based upon the start time and the time block size limit.

2. The method of claim 1 wherein the plurality of messages are sent between a plurality of users using an instant messaging program.

3. The method of claim 2 wherein the formatted chat event is displayed on the electronic calendar using a calendar program, which is a separate computer program from the instant messaging program.

4. The method of claim 2 further comprising:
   receiving a chat event detail request, the chat event detail request corresponding to one of the plurality of users selecting the formatted chat event; and
   displaying the plurality of messages in response to receiving the chat event detail request.

5. The method of claim 2 further comprising:
   in response to determining that the chat event duration is not longer than the time block size limit, overlaying the formatted chat event on the electronic calendar as the time-based calendar event that begins at the start time and ends at the stop time.

6. The method of claim 3 further comprising:
   receiving a chat session request at the instant messaging program from one of the plurality of users;
   in response to receiving the chat request, logging a start time and the plurality of messages until it is detected that the chat event is complete;

storing the logged messages as the chat event; and
performing the retrieving using the calendar program.

7. A computer program product stored on a computer operable media, the computer operable media containing instructions for execution by a computer, which, when executed by the computer, cause the computer to implement a method for displaying chat history on an electronic calendar, the method comprising:

receiving a chat history overlay request;
retrieving a chat event in response to receiving the chat history overlay request, the chat event including a plurality of messages;
formatting the retrieved chat event;
identifying a start time and a stop time corresponding to the chat event, the start time corresponding to a first message included in the plurality of messages and the stop time corresponding to a last message included in the plurality of messages;
retrieving a time block size limit from a storage location;
computing a chat event duration based upon the start time and the stop time;
determining whether the chat event duration is longer than the time block size limit; and
in response to determining that the chat event duration is longer than the time block size limit, overlaying the formatted chat event on an electronic calendar as a time-based calendar event that begins at the start time and ends at a time that is based upon the start time and the time block size limit.

8. The computer program product of claim 7 wherein the plurality of messages are sent between a plurality of users using an instant messaging program.

9. The computer program product of claim 8 wherein the formatted chat event is displayed on the electronic calendar using a calendar program, which is a separate entity than the instant messaging program.

10. The computer program product of claim 8 wherein the method further comprises:

receiving a chat event detail request, the chat event detail request corresponding to one of the plurality of users selecting the formatted chat event; and
displaying the plurality of messages in response to receiving the chat event detail request.

11. The computer program product of claim 8 wherein the method further comprises:

in response to determining that the chat event duration is not longer than the time block size limit, overlaying the formatted chat event on the electronic calendar as the time-based calendar event that begins at the start time and ends at the stop time.

12. The computer program product of claim 9 wherein the method further comprises:

receiving a chat session request at the instant messaging program from one of the plurality of users;
in response to receiving the chat request, logging a start time and the plurality of messages until it is detected that the chat event is complete;
storing the logged messages as the chat event; and
performing the retrieving using the calendar program.

13. An information handling system comprising:
one or more processors;
a memory accessible by the processors;
one or more nonvolatile storage devices accessible by the processors;
a display; and
a chat history overlay tool for displaying chat history on an electronic calendar, the chat history overlay tool being effective to:
receive a chat history overlay request;
retrieve a chat event from one of the nonvolatile storage devices in response to receiving the chat history overlay request, the chat event including a plurality of messages;
format the retrieved chat event;
identify a start time and a stop time corresponding to the chat event, the start time corresponding to a first message included in the plurality of messages and the stop time corresponding to a last message included in the plurality of messages;
retrieve a time block size limit from one of the nonvolatile storage devices;
compute a chat event duration based upon the start time and the stop time;
determine whether the chat event duration is longer than the time block size limit;
and in response to determining that the chat event duration is longer than the time block size limit, overlaying the formatted chat event on an electronic calendar as a time-based calendar event that begins at the start time and ends at a time that is based upon the start time and the time block size limit.

14. The information handling system of claim 13 wherein the plurality of messages are sent between a plurality of users over a computer network using an instant messaging program.

15. The information handling system of claim 14 wherein the formatted chat event is displayed on the electronic calendar using a calendar program, which is a separate computer program from the instant messaging program.

16. The information handling system of claim 14 wherein the chat history overlay tool is further effective to:
receive a chat event detail request, the chat event detail request corresponding to one of the plurality of users selecting the formatted chat event; and
display the plurality of messages on the display in response to receiving the chat event detail request.

17. The information handling system of claim 14 wherein the chat history overlay tool is further effective to:
in response to determining that the chat event duration is not longer than the time block size limit, overlay the formatted chat event on the electronic calendar as the time-based calendar event that begins at the start time and ends at the stop time.

* * * * *